(12) United States Patent
Qu et al.

(10) Patent No.: US 7,657,234 B2
(45) Date of Patent: *Feb. 2, 2010

(54) TRANSPARENT BROADCAST SERVICES FOR A MULTI-MODE WIRELESS DEVICE

(75) Inventors: Hai Qu, San Dieog, CA (US); Andrew Angeles Panganiban, San Diego, CA (US); Guangming Carl Shi, San Diego, CA (US); Pratik Mahesh Dhebri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 10/773,783

(22) Filed: Feb. 5, 2004

(65) Prior Publication Data

US 2005/0176445 A1 Aug. 11, 2005

(51) Int. Cl.
*H04B 7/00* (2006.01)
(52) U.S. Cl. .................. 455/72; 455/528; 455/458; 455/561; 455/500; 455/552.1; 455/517; 455/70; 370/328
(58) Field of Classification Search .............. 455/550.1, 455/553.1, 458, 517, 72, 71, 524
See application file for complete search history.

(56) References Cited

U.S. PATENT DOCUMENTS 5,708,662 A 1/1998 Takashima 5,878,033 A * 3/1999 Mouly .................. 370/312
6,675,022 B2 * 1/2004 Burgan et al. ............ 455/524
2002/0135462 A1 * 9/2002 Nels et al. ................ 340/7.3

(Continued)

FOREIGN PATENT DOCUMENTS

EP 1372321 12/2003

(Continued)

OTHER PUBLICATIONS

3rd Generation Partnership Project; Technical Specification Group Terminals; Alphabets and language-specific information (Release 6), 3GPP TS 23.038 V6.0,0, pp. 1-20 (Sep. 2003).

(Continued)

*Primary Examiner*—Charles N Appiah
*Assistant Examiner*—Randy Peaches
(74) *Attorney, Agent, or Firm*—John J. Ketchum

(57) ABSTRACT

To provide "transparent" broadcast services for a multi-mode wireless device capable of communicating with multiple wireless communication networks, a composite set of pertinent parameters for broadcast messages used by the multiple networks is defined. The parameters of the broadcast message for each network are mapped to corresponding parameters in the composite set. The composite set of parameters is used for processing and displaying broadcast messages received from the multiple networks. A broadcast message for each network (e.g., a CBS message in GSM or a broadcast SMS message in CDMA) is received and processed in accordance with the parameters of the message and filtering configurations applicable for the network. The parameters of the broadcast message are mapped to corresponding parameters in the composite set. The broadcast message is further processed and displayed based on the parameters in the composite set.

28 Claims, 8 Drawing Sheets

U.S. PATENT DOCUMENTS

| | | | |
|---|---|---|---|
| 2002/0152220 A1* | 10/2002 | Kang et al. | 707/101 |
| 2003/0040300 A1 | 2/2003 | Bodic et al. | 455/412 |
| 2003/0224814 A1* | 12/2003 | Qu et al. | 455/517 |
| 2004/0076126 A1* | 4/2004 | Qu et al. | 370/320 |
| 2004/0116140 A1* | 6/2004 | Babbar et al. | 455/517 |
| 2004/0137955 A1* | 7/2004 | Engstrom et al. | 455/566 |

FOREIGN PATENT DOCUMENTS

| | | |
|---|---|---|
| GB | 2382683 | 12/2001 |
| JP | 06-251289 | 9/2004 |
| RU | 2157598 | 10/2000 |
| WO | 99004583 | 1/1999 |
| WO | 01015444 A1 | 8/2000 |
| WO | WO0110146 A1 * | 2/2001 |
| WO | 2004012470 | 2/2004 |

OTHER PUBLICATIONS

3rd Generation Partnership Project; Technical Specification Group Terminals; Technical realization of Cell Broadcast Service (CBS)(Release 7), 3GPP TS 23.041 V7.0.0 pp. 1-36 (Mar. 2006).

International Search Report, PCT/US2005/003587 - International Search Authority - European Patent Office, Aug. 29, 2005.

International Preliminary Report on Patentability, PCT/US2005/003587 - The International Bureau of WIPO - Geneva, Switzerland, Aug. 7, 2006.

Written Opinion, PCT/US2005/003587 - International Search Authority - European Patent Office, Aug. 29, 2005.

* cited by examiner

Service Table 400

| Service Category | Language | Label | Priority | Selected | Alert Option | Max Messages | ••• |
|---|---|---|---|---|---|---|---|
| General News - Local | English | Local News | 00 | Yes | 0000 | 10 | |
| General News - National | Spanish | National News | 10 | No | 0010 | 5 | |
| Sports News - National | English | Sports News | 00 | Yes | 0100 | 20 | |
| Area Traffic Reports | English | Traffic | 01 | No | 0000 | 5 | |
| Local Weather | English | Weather | 11 | No | 1010 | 3 | |
| Stock Quotes | English | Quotes | 00 | Yes | 0000 | 20 | |
| ••• | ••• | ••• | ••• | ••• | ••• | ••• | |

*FIG. 4*

TRANSPARENT BROADCAST SERVICES FOR A MULTI-MODE WIRELESS DEVICE

BACKGROUND

I. Field

The present invention relates generally to communication, and more specifically to techniques for providing transparent broadcast services for a multi-mode wireless device capable of communicating with multiple wireless communication networks.

II. Background

Wireless communication networks are widely deployed to provide various types of services such as voice, packet data, broadcast, and so on. These wireless networks include Code Division Multiple Access (CDMA) networks, Global System for Mobile Communications (GSM) networks, Universal Mobile Telecommunications System (UMTS) networks, and so on. A network typically refers to a deployment of a system, although these two terms are also used interchangeably.

Each wireless network utilizes a particular air interface to support over-the-air communication and typically further implements a particular mobile networking protocol that supports roaming and advanced services. For example, a CDMA network utilizes a CDMA air interface and an ANSI-41 networking protocol. The CDMA network may implement one or more CDMA standards such as IS-2000 (1xEV), IS-856 (1x-EVDO), IS-95, and so on. A GSM network utilizes a GSM air interface and a GSM Mobile Application Part (GSM-MAP) networking protocol. The GSM network implements GSM standard and may further support General Packet Radio Service (GPRS), which is a data bearer that allows wireless devices to send and receive data via an Internet Protocol (IP)-based network. A GSM/GPRS device can access data networks, such as the Internet, when operating in GPRS mode. A UMTS network utilizes a Wideband CDMA (W-CDMA) air interface and the GSM-MAP networking protocol. The UMTS network implements 3GPP standard, which incorporates the GSM standard. These various standards are known in the art.

The GSM and UMTS networks may provide Cell Broadcast Service (CBS), which is a service that periodically broadcasts messages to users within the networks. Similarly, the CDMA network may provide a broadcast service that broadcasts messages to users within the network. The broadcast messages can carry various types of information such as news, traffic reports, weather information, and so on.

The broadcast services in GSM, UMTS and CDMA networks are implemented with Short Message Service (SMS), which is a service that supports the exchange of SMS or short messages between a wireless network and wireless devices (e.g., cellular phones). SMS is network technology dependent, and different SMS implementations have been defined for ANSI-41 and GSM-MAP. Each SMS implementation has different capabilities and utilizes different message types and formats for sending SMS messages. The SMS implementation for an ANSI-41 network is described in a document TIA/EIA-637-B, entitled "Short Message Service for Wideband Spread Spectrum Systems." The SMS implementation for a GSM-MAP network is described in documents 3GPP TS 23.038, TS 23.040, and other 3GPP documents. These documents are publicly available. For simplicity, the SMS implementation for GSM-MAP is referred to as "GSM SMS", and the SMS implementation for ANSI-41 is referred to as "CDMA SMS". UMTS supports Broadcast Multicast Control (BMC), which can carry GSM and CDMA SMS messages.

A multi-mode wireless device can communicate with multiple wireless networks (e.g., GSM and CDMA networks) and may be able to receive broadcast messages from these networks. However, the broadcast messages for the GSM and CDMA networks have different formats because CDMA SMS and GSM SMS have different implementations. The different broadcast message formats complicate the reception of broadcast services from multiple wireless networks because a user may need to know which fields are applicable to each broadcast message format and how the fields should be interpreted and processed.

There is therefore a need in the art for techniques to support broadcast services for a multi-mode wireless device.

SUMMARY

Techniques for providing "transparent" broadcast services in a multi-mode wireless device capable of communicating with multiple wireless communication networks are described herein. The wireless device provides an interface that hides implementation details for broadcast services by the different networks so that a user does not need to be aware of which broadcast services are being received from which wireless networks. This simplifies the reception of broadcast services from multiple networks and enhances user experience. To support transparent broadcast services, a composite set (or superset) of pertinent parameters for broadcast messages used by the multiple networks is defined. The parameters of the broadcast message for each network are mapped to corresponding parameters in the composite set. The composite set of parameters is used for processing and displaying broadcast messages received from the multiple networks.

In an embodiment for providing transparent broadcast services at the wireless device, filtering configurations used to filter broadcast messages at the wireless device are initially set by a network operator/service provider and/or the user, as described below. For broadcast reception for a first network (e.g., a GSM or UMTS network), a first broadcast message (e.g., a CBS message) for the first network is received and processed in accordance with the parameters of this message and the filtering configurations for the first network. The parameters of the first broadcast message are mapped to corresponding parameters in the composite set. The first broadcast message is further processed and displayed based on the parameters in the composite set. For broadcast reception for a second network (e.g., a CDMA network), a second broadcast message (e.g., a broadcast SMS message) for the second network is received and processed in accordance with the parameters of this message and the filtering configurations for the second network. The parameters of the second broadcast message are mapped to corresponding parameters in the composite set. The second broadcast message is further processed and displayed based on the parameters in the composite set. The wireless device may be able to receive and process broadcast messages for only one network at a time or for both networks concurrently.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 4 shows a service table used for filtering broadcast messages;

DETAILED DESCRIPTION

Figure 1:
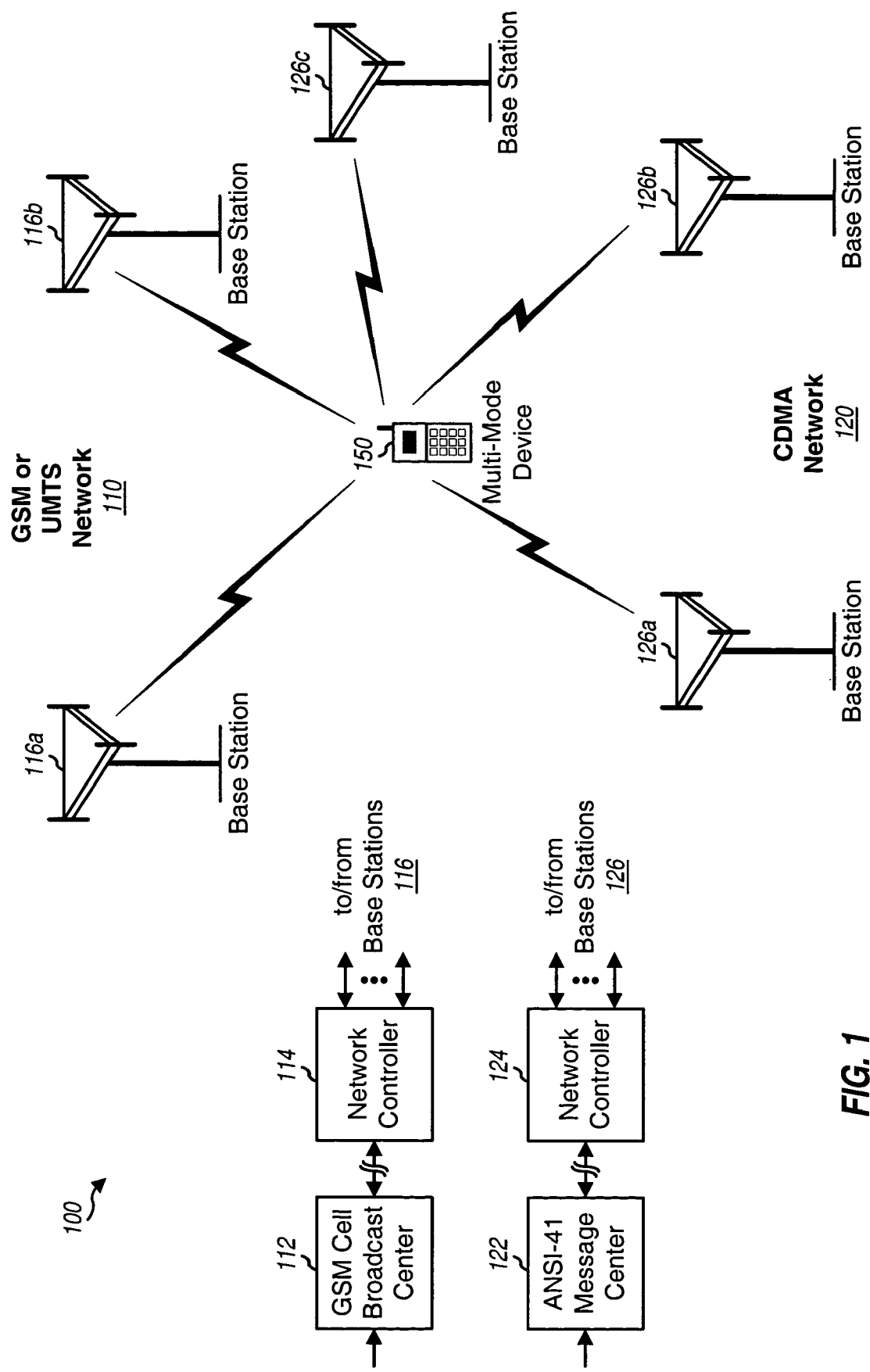
FIG. 1 shows a GSM or UMTS network and a CDMA network.

FIG. 1 shows communication networks 100 that include a GSM or UMTS network 110 and a CDMA network 120 (i.e., network 110 may be a GSM network or a UMTS network). GSM or UMTS network 110 includes a GSM cell broadcast center (CBC) 112, a network controller 114, and base stations 116. CDMA network 120 includes an ANSI-41 message center 122, a network controller 124, and base station 126. Networks 110 and 120 implement GSM-MAP and ANSI-41 networking protocols, respectively.

Cell broadcast center 112 and message center 122 receive and store broadcast data from various sources and further generate and forward broadcast messages for networks 110 and 120, respectively. Cell broadcast center 112 communicates with network controller 114 (possibly via other network entities) and supports broadcast services for GSM or UMTS network 110. Message center 122 communicates with network controller 124 (possibly via other network entities) and supports broadcast services for CDMA network 120. Network controller 114 and 124 route messages and data for the wireless devices within their coverage area. A network controller is referred to as a base station controller (BSC) in GSM, a radio network controller (RNC) in UMTS, and a BSC and a mobile switching center (MSC) in CDMA. Each network controller couples to a number of base stations and controls the communication for the wireless devices under the coverage of these base stations. Each of networks 110 and 120 may also include multiple cell broadcast/message centers and/or network controllers.

Base stations 116 and 126 are fixed stations that communicate with the wireless devices. Each base station communicates with the wireless devices under its coverage area to support various services such as voice, packet data, broadcast, and so on. For simplicity, only one multi-mode wireless device 150 is shown in FIG. 1. Wireless device 150 (e.g., a dual-mode cellular phone) can communicate with GSM or UMTS network 110 and CDMA network 120. This capability allows a subscriber/user to receive services from multiple networks for improved performance and coverage. Wireless device 150 may be fixed or mobile and may also be referred to as a user equipment (UE), a mobile station (MS), a mobile equipment (ME), a cellular phone, a user terminal, a handset, a wireless communication device, or some other terminology.

Broadcast services for GSM, UMTS and CDMA are implemented with SMS. SMS is network technology dependent, and two SMS implementations have been defined for ANSI-41 and GSM-MAP. Each SMS implementation has different capabilities and utilizes different message types and formats for sending SMS messages. In the following description, "parameter", "subparameter", and "field" are used to denote attributes of a message. For clarity, these three terms are used for different hierarchical levels of a message. However, in general, these terms may be considered as synonymous terms that can be used interchangeably.

Figure 2A:
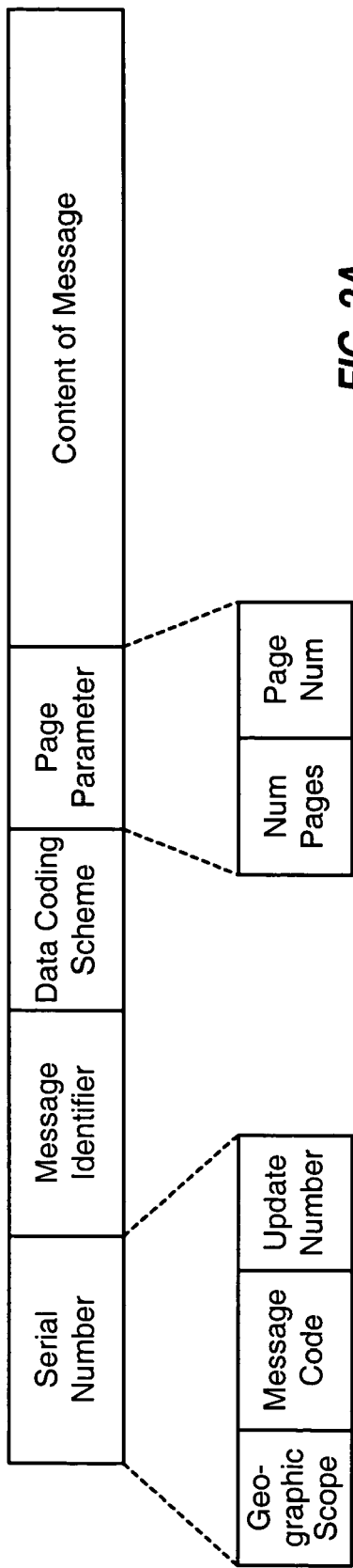
FIGS. 2A and 2B show a GSM CBS message and a UMTS CBS message, respectively.

FIG. 2A shows the format of a GSM CBS message used for CBS service by a GSM network. In GSM, a broadcast message may include up to 15 broadcast pages, and each broadcast page contains a fixed block of 88 octets. Cell broadcast center 112 may generate up to 15 broadcast pages for a long multi-page broadcast message. Each broadcast page is transmitted over the air as a GSM CBS message.

As shown in FIG. 2A, the GSM CBS message includes five parameters. The Message Identifier parameter identifies the source (or sender) and the type (or service category) of the GSM CBS message. The values for the Message Identifier may be assigned by the network and signaled to the wireless devices. The Serial Number parameter identifies a particular CBS message from the source and type indicated by the Message Identifier. The Serial Number includes (1) a Message Code field that differentiates CBS messages from the same source and type (i.e., with the same Message Identifier value), (2) a Geographical Scope (GS) field that indicates the geographical area over which the Message Code is unique and the display mode for the message, and (3) an Update Number field that indicates a change in the content of the same CBS message (i.e., with the same Message Identifier, Geographical Scope, and Message Code). The Data Coding Scheme (DCS) parameter indicates various processing parameters (e.g., the alphabet or character set, coding, and language) for the CBS message. The Page Parameter indicates the number of broadcast pages in the broadcast message and the specific broadcast page within the broadcast message. The Content of Message parameter contains the broadcast data for the GSM CBS message. The GSM CBS message format is described in 3GPP TS 23.041.

Figure 2B:
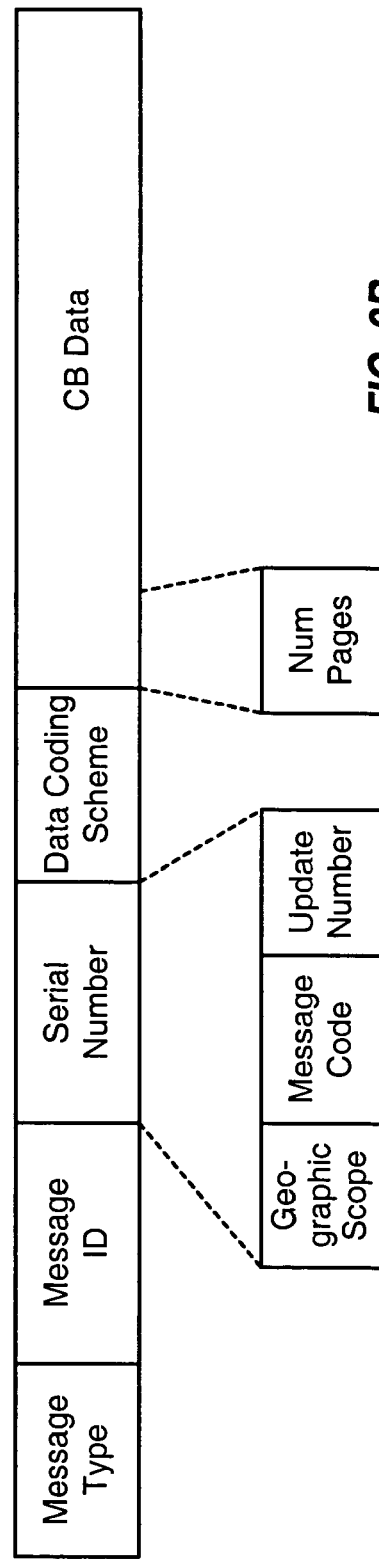

FIG. 2B shows the format of a UMTS CBS message used for CBS service by a UMTS network. The Message Type parameter indicates whether the UMTS CBS message is a CBS message containing information or a Scheduling message containing a schedule of CBS messages to be sent. The Message Identifier, Serial Number, and Data Coding Scheme parameters are as described above for the GSM CBS message. The CB Data parameter includes (1) the number of pages within the UMTS CBS message, (2) the broadcast data carried by the message, and (3) the length of the broadcast data in the message. The UMTS CBS message format is also described in 3GPP TS 23.041.

As shown in FIGS. 2A and 2B, the GSM CBS message and the UMTS CBS message contain many of the same parameters. For simplicity, they are collectively referred to as a CBS message and treated as one message type in the following description. A CBS message may be a GSM CBS message or a UMTS CBS message.

Figure 3:
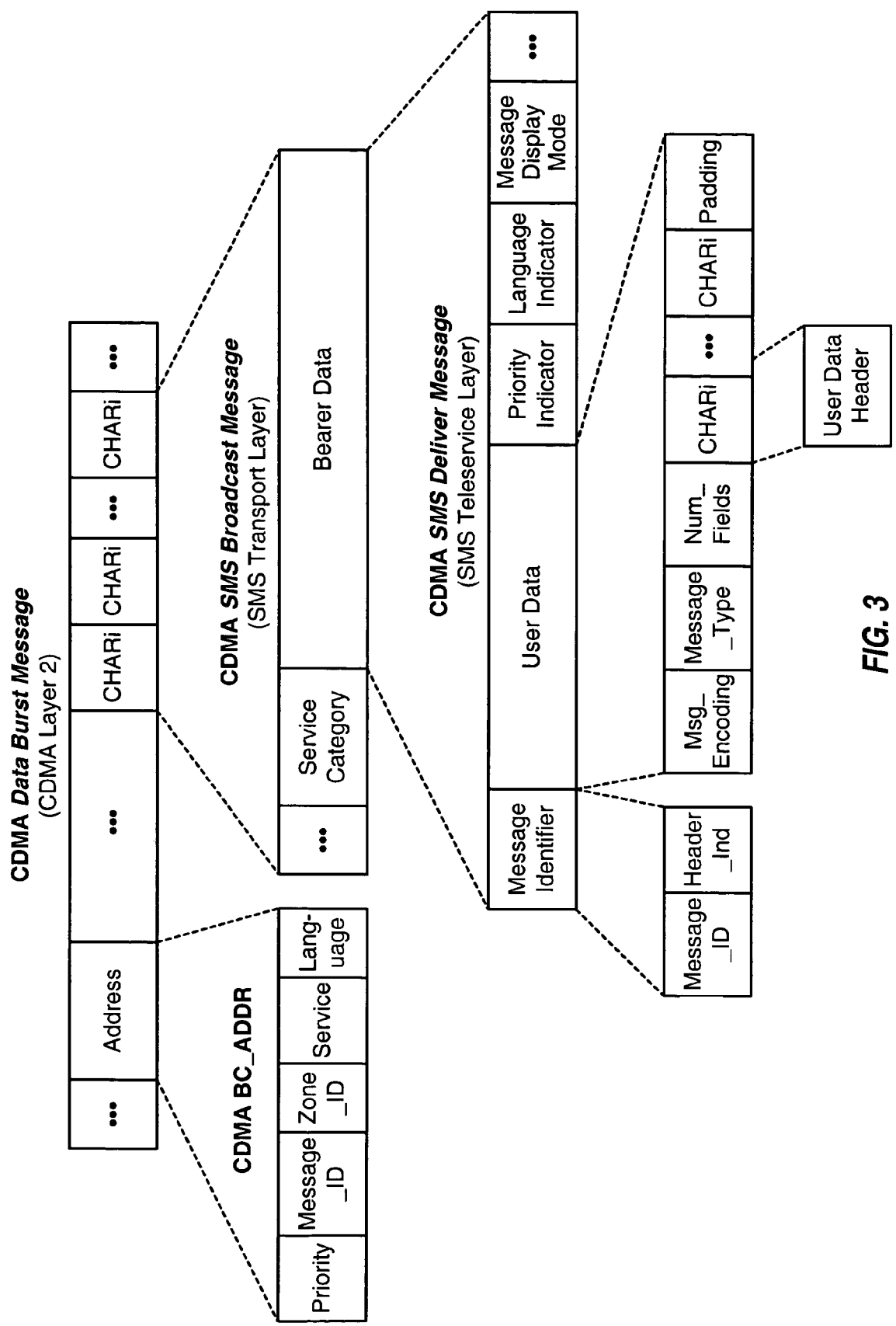
FIG. 3 shows various messages for supporting broadcast services in CDMA.

FIG. 3 shows the formats of various messages used to support broadcast services in CDMA network 120. For CDMA, data to be broadcast by message center 122 is first encapsulated in an SMS Deliver Message at a Teleservice Layer, which is the top-most layer in the CDMA SMS protocol stack. The SMS Deliver Message includes various fields that describe attributes of the message, and is further encapsulated in an SMS Broadcast Message at a Transport Layer, which is the next lower SMS layer that manages end-to-end delivery of SMS messages in CDMA. The SMS Broadcast Message includes various fields used for transport related functions, and is further encapsulated in a Data Burst Message, which is a message at Layer 3 for IS-2000 and IS-95. The Data Burst Message is further processed and transmitted to wireless devices in CDMA network 120.

The SMS Broadcast Message includes various parameters, two of which are shown in FIG. 3. The Service Category parameter identifies the service category for the broadcast SMS message. The Bearer Data parameter carries the SMS Deliver Message. The SMS Broadcast Message may include other parameters that are not shown in FIG. 3 for simplicity.

The SMS Deliver Message includes various subparameters, five of which are shown in FIG. 3. The Message Identifier subparameter contains various fields, two of which are shown in FIG. 3. The Message_ID field contains a value used to identify SMS messages that have been sent. The Header_Ind field indicates whether or not the User Data subparameter includes a User Data Header field. The User Data subparameter includes various fields, five of which are shown in FIG. 3. The Msg_Encoding field indicates the coding scheme used for the broadcast data in the message. The Message_Type field indicates the type of the message. The Num_Fields field indicates the number of occurrences of the following CHARi field. Each instance of the CHARi field carries one character of broadcast data. The User Data Header field, if present, is carried by the CHARi field and contains information used to concatenate individual SMS messages for a long broadcast message. The Padding field caries 0 to 7 bits to make the User Data subparameter an integer number of octets in length. The broadcast data is carried in the CHARi fields of the User Data subparameter. The Priority Indicator subparameter indicates the priority level of the message. The Language Indicator subparameter indicates the language of the message. The Message Display Mode subparameter indicates the display option for the message, which may be (1) 'immediate display'—display as soon as possible, (2) 'mobile default setting'—display based on default setting for the wireless device, or (3) 'user invoke'—display only when invoked by the user.

The Data Burst Message is further associated with a BC_ADDR that contains (1) a Priority field that indicates the priority of the message, (2) a Message_ID field that distinguishes different messages for the same service, (3) a Zone_ID field that indicates the geographic zone for which the message is to be sent, (4) a Service field that indicates the service associated with the message, and (5) a Language field that indicates the language used for the message. The CDMA SMS message formats are described in TIA/EIA-637-B.

As shown in FIGS. 2A, 2B and 3 and described above, the broadcast messages for different networks have different formats. As a result, broadcast messages received from different networks by multi-mode wireless device 150 can have different parameters and content coding. Moreover, the broadcast services for different networks can have different filtering configurations, as described below. All of this can complicate the reception of broadcast services from multiple networks.

Multi-mode wireless device 150 can be designed to support transparent broadcast services for different wireless networks using the techniques described herein. Transparent broadcast services are achieved by providing the user with an interface that hides implementation details for broadcast services by different networks. Thus, the user does not need to be aware of which specific broadcast services are being received, and the broadcast services from different networks appear transparent to the user. The transparent broadcast services simplify the reception of broadcast services from different networks and enhance user experience.

1. Composite Set of Parameters

To support transparent broadcast services, a composite set (or superset) of pertinent parameters for broadcast messages used by the different networks is defined. The parameters/subparameters/fields of the broadcast message for each network are mapped to corresponding parameters in the composite set. The composite set of parameters is used for processing and displaying broadcast messages received from different wireless networks.

Table 1 shows a composite set of parameters that may be used for (1) the CBS message for the GSM and UMTS networks and (2) the broadcast SMS message for the CDMA network. The first column of Table 1 lists the parameters in the composite set. The second column lists the parameters/fields of the CBS message (for GSM and UMTS) that are mapped to the corresponding parameters in the composite set. The third column lists the parameters/subparameters/fields of the broadcast SMS message (for CDMA) that are mapped to the corresponding parameters in the composite set. The mapping is described in further detail below. The parameters in the composite set are populated with contents/values obtained from the mapped parameters of a received broadcast message, which may be either a CBS message or a broadcast SMS message.

TABLE 1

Composite Set of Parameters

| Composite Set Parameters | CBS Parameters (GSM & UMTS) | Broadcast SMS Parameters (CDMA) |
| --- | --- | --- |
| Message Type | CBS (GSM & UMTS) CBS41 (UMTS) | CBS41 |
| Service ID | Message Identifier | Service Category, Language |
| Encoding | Data Coding Scheme | Msg_Encoding & Message_Type |
| Language | Data Coding Scheme | Language Indicator |
| Message Class | Data Coding Scheme | N/A |
| Message Concatenation | Page Parameter | Header_Ind & User Data Header |
| Geographic Scope | Geographic Scope | Zone-ID |
| Display Mode | Geographic Scope | Message Display Mode |
| Message Replacement | Message Code & Update Number | Message ID |
| User Data Header | Data Coding Scheme & Content of Message/ CB Data | Header_Ind & User Data |
| Channel Guide | Index Message | N/A |

Message Type The Message Type parameter indicates the broadcast message type. The received broadcast message may be a CBS message (CBS) or a broadcast SMS message (CBS41). CBS is supported by GSM and UMTS. CBS41 is supported by CDMA and can also be supported by UMTS. Different values may be assigned for CBS and CBS41. The Message Type parameter is set to the proper value based on the type of the received broadcast message.

Service ID The Service ID parameter indicates the broadcast service for the received broadcast message. For GSM and UMTS, the Message Identifier parameter in the CBS message contains a single value for both the source and type of the message. Each unique value for the Message Identifier can be considered as a different broadcast service. For CDMA, a combination of Service Category and Language identifies a unique broadcast service. However, other combination of parameters for CDMA SMS may also be used for the Service ID parameter.

Encoding The Encoding parameter indicates the alphabet/character set used for the broadcast data in the received broadcast message. GSM and UMTS support three character sets—GSM 7-bit, 8-bit data, and 16-bit Unicode (UCS2). This information is embedded/encoded within the Data Coding Scheme (DCS) parameter (as described in 3GPP TS 23.038) and can be extracted and mapped to the Encoding parameter. CDMA supports a number of character sets including Octet, IS-91 extended protocol message, 7-bit ASCII, IA5, Unicode, Shift-JIS, Korean, Latin/Hebrew, Latin, and GSM 7-bit default alphabet. This information is contained in the Msg_Encoding and Message_Type fields of the User Data subparameter and can be extracted and mapped to the Encoding parameter.

Language The Language parameter indicates the language used for the received broadcast message. GSM and UMTS support a number of languages, as specified in 3GPP TS 23.038 and ISO 639. This information is embedded/encoded within the Data Coding Scheme parameter and can be extracted and mapped to the Language parameter. CDMA supports a set of languages including Unspecified, English, French, Spanish, Japanese, Korean, Chinese, and Hebrew. This information is contained in the Language Indicator subparameter and can be extracted and mapped to the Language parameter.

Message Class The Message Class parameter indicates the handling and routing of the received broadcast message. GSM and UMTS support four message classes: class 0 for general messages, class 1 for ME-specific messages, class 2 for SIM/USIM messages, and class 3 for TE-specific messages. The mobile equipment (ME) is the wireless device. The terminal equipment (TE) may be a computer, a PDA, or some other device that may connect to the wireless device. The Subscriber Identity Module (SIM) and Universal Subscriber Identity Module (USIM) are removable modules for the wireless device. The message class information is embedded/encoded within the Data Coding Scheme parameter and can be extracted and mapped to the Message Class parameter. CDMA does not utilize this message class concept. A default value may be used for the Message Class parameter for CDMA.

Message Concatenation The Message Concatenation parameter carries information used to concatenate multiple broadcast pages into a long broadcast message. For GSM, the Page Parameter contains two fields for the number of broadcast pages in the broadcast message and the specific broadcast page within the broadcast message. For UMTS, the number of broadcast pages is included in the CB Data parameter of the CBS message. The page information for GSM and UMTS may be mapped to the Message Concatenation parameter. For CDMA, the Header_Ind field in the Message Identifier subparameter indicates whether or not the User Data subparameter contains a User Data Header field, which in turn contains information for concatenating a long broadcast message. The concatenation information from these two fields may be mapped to the Message Concatenation parameter.

Geographic Scope The Geographic Scope parameter in the composite set indicates the geographic area for the received broadcast message. For GSM and UMTS, the Geographic Scope field of the CBS message indicates the geographic area for the message. The geographic area for the CBS message may be cell wide, PLMN wide, Location Area wide (in GSM), or Service Area wide (in UMTS), where PLMN stands for public land mobile network. This information may be extracted from the Geographic Scope field of the CBS message and mapped to the Geographic Scope parameter in the composite set. CDMA does not utilize this geographic scope concept so a default value may be used for the Geographic Scope parameter. Alternatively, the Zone_ID information from the BC_ADDR may be mapped to the Geographic Scope parameter, as indicated in Table 1.

Display Mode The Display Mode parameter indicates the display option for the received broadcast message. For GSM and UMTS, the Geographic Scope field of the CBS message also indicates the display mode for the message. The display mode may be (1) 'immediate' to display the CBS message all the time or (2) 'normal' to display the CBS message only if the user elects to see the message via user interaction. The display mode for the received CBS message may be mapped to the Display Mode parameter. For CDMA, the Message Display Mode subparameter indicates the display mode for the broadcast SMS message, as described above, and may be mapped to the Display Mode parameter.

Message Replacement The Message Replacement parameter contains information used to replace an old broadcast message with a new broadcast message that contains updated broadcast data. For GSM and UMTS, the Update Number indicates a change in the message content of the same CBS message. The information indicating an updated CBS message may be obtained from the received CBS message and mapped to the Message Replacement parameter. For CDMA, the Message_ID field in the Message Identifier subparameter contains a value used to identify the sent SMS message. This information may be extracted and mapped to the Message Replacement parameter.

User Data Header The User Data Header parameter (1) indicates whether or not the received broadcast message contains a header and (2) contains the header itself. For GSM and UMTS, the presence of User Data Header is determined by the DCS parameter in a CBS message, and the User Data Header resides in the CB Data field of the CBS message. For CDMA, the presence of User Data Header is determined by the Header_Ind field of the Message Identifier subparameter in the SMS Deliver Message for a CDMA Broadcast message, and the User Data Header resides in the User Data subparameter of the SMS Deliver Message. The first byte indicates the total length of the User Data Header. There can be multiple User Data Headers present, which can provide additional attributes for a message and Enhanced Messaging Service (EMS) contents, such as bitmaps, animations, melodies, text styles, and so on. The header information for CDMA may be extracted from these fields/subparameters and mapped to the Message Header parameter.

Channel Guide The Channel Guide parameter contains a table of available broadcast services. For GSM and UITS, a broadcast service is defined by a combination of source and type, and a network operator can define broadcast services and assign values to these broadcast services (i.e., define the meaning and the values for the Message Identifier). The broadcast services and their assigned values are stored in an index structure. The index structure is broadcast to the wireless devices via Index messages, which are CBS messages with a value of '1010101010b' for the Message Code. The wireless devices receive and store the index structure. Each CBS message is for one of the broadcast services described in the index structure (i.e., the Message Identifier value for the CBS message will match one of the values in the index structure). The index structure for GSM and UMTS can be stored in the Channel Guide parameter.

For CDMA, the service categories are defined in a publicly available document TSB-58-E. A network operator can define its own service category using the "Proprietary Service Category" range from 0x8001-0xFFFF. Each broadcast SMS message is for one of the defined service categories (i.e., the Service Category parameter contains a value matching one of the defined service categories). The service categories defined by CDMA can also be stored in the Channel Guide parameter. Thus, to support GSM, UMTS, and CDMA, the Channel Guide parameter can store a superset of all of the broadcast services/service categories defined by all of these networks.

Table 1 shows a composite set of parameters that may be used for broadcast messages in GSM, UMTS and CDMA networks. Table 1 also shows a mapping of the parameters/subparameters/fields of the broadcast messages for these networks to the parameters in the composite set. In general, the composite set may include more, different, and/or fewer parameters than those listed in Table 1, and this is within the scope of the invention. Furthermore, the mapping may be different than that shown in Table 1.

In general, the composite set includes a parameter for each broadcast message parameter/subparameter/field that is deemed to be pertinent. If a given parameter in the composite set is applicable for only one network, then this parameter can take on the values defined by the one network for this parameter, and a default value may be used for other networks that do not use this parameter. As an example, the Message Class parameter may be set to '0', '1', '2' or '3' for GSM and to a default value for CDMA. If a given parameter in the composite set is applicable for multiple networks, then this parameter can take on the values defined by the multiple networks. For example, the Display Mode parameter may take on (1) 'immediate' or 'normal' for GSM and UMTS and (2) 'immediate display', 'mobile default setting', or 'user invoke' for CDMA. Thus, each parameter in the composite set may be applicable to one or multiple networks.

The mapping may not be clear if two parameters for two networks are related but have different scope. For example, the Message Identifier parameter for GSM and UMTS indicates both the source and type of the CBS message whereas the Service Category parameter for CDMA indicates only the service category for the broadcast SMS message. In this case, the mapping may be performed in various manners. For example, the Message Identifier parameter may be decomposed into the source and the type, which may then be mapped to two parameters in the composite set. Alternatively, the source and type may be mapped to a single parameter (Service ID) in the composite set and a combination of service category and language may be used for CDMA, as shown in Table 1. The mapping may be dependent on design preference, user preference, and/or other considerations.

The use of the composite set of parameters for processing and displaying broadcast messages for transparent broadcast services is described below.

2. Filtering Configurations

Broadcast messages may be sent by the networks for various types/service categories, in various languages, and so on. The wireless device may be allowed to receive all, some, or none of these broadcast messages (e.g., based on a service subscription for the wireless device). Furthermore, the user may be interested in all, some, or none of the broadcast messages that are allowed to be received. A filtering mechanism is used to filter broadcast messages at the wireless device based on all of the applicable network and user requirements.

FIG. 4 shows a service table 400 that may be maintained by the wireless device for filtering broadcast messages. For the embodiment shown in FIG. 4, the service table includes seven columns for Service Category, Language, Label, Priority, Selected, Alert Option, and Max Messages. The Service Category column identifies the service categories that have been programmed into the service table. The Language column indicates the language associated with each programmed service category. The service table includes one entry (or row) for each broadcast service, which may be (1) a unique combination of service category and language for CDMA or (2) a unique Message Identifier value for GSM and UMTS.

The Label column stores user recognizable labels (e.g., "Local News") for the service categories, which are assigned non-recognizable values (e.g., 0x0004). The Priority column indicates the priority selected by the user for each programmed entry in the service table. The Selected column indicates whether or not each programmed entry in the service table has been selected for reception by the user. Only broadcast messages for selected programmed entries are processed by the wireless device (assuming that other criteria, if any, are also satisfied). The Alert Option column indicates the particular option (e.g., vibrate, ring, and so on) to alert the user of a new broadcast message for each programmed entry. The Max Messages column indicates the maximum number of broadcast messages to be stored for each programmed entry. The service table may include other columns for other information useful for broadcast messages. In general, any number and any combination of columns in the service table may be used for filtering broadcast messages.

The filtering of broadcast messages at the wireless device may be performed based on various criteria. For example, the broadcast message filtering criteria may be classified into three categories: network configuration, user configuration, and user preferences.

Network configuration includes filtering criteria imposed by the network operator/service provider and is typically programmed into the wireless device either prior to or during activation of the wireless device. Table 2 lists possible settings for network configuration for CDMA. The incoming broadcast messages are filtered by the wireless device based on the programmed network configuration setting.

TABLE 2

Network Configuration

| Setting | Description |
|---|---|
| Allow All | This setting allows the wireless device to receive all broadcast messages. |
| Allow Table Only | This setting allows the wireless device to receive only broadcast messages for the service categories that have been programmed in the service table. |
| Disallow | This setting disables the wireless device's broadcast service capability (i.e., the wireless device will not process broadcast messages). |

User configuration includes filtering criteria determined by the user. Table 3 lists possible settings for user configuration for CDMA. The incoming broadcast messages are further filtered by the wireless device based on the selected user configuration setting.

TABLE 3

User Configuration

| Setting | Description |
|---|---|
| Activate All | This setting allows the wireless device to receive all broadcast messages and is valid only if the network configuration is 'Allow All'. |
| Activate Table Only | This setting allows the wireless device to receive only broadcast messages for the service categories that have been programmed in the service table, subject to any additional filtering criteria included in the service table based on user preferences. This setting is valid if the network configuration is not 'Disallow'. The user can selectively enable and disable individual programmed entries in the service table. |

TABLE 3-continued

User Configuration

| Setting | Description |
| --- | --- |
| Deactivate | This setting disables the wireless device's broadcast service functions. |

The user configuration is restricted/constrained by the network configuration. The user cannot select a user configuration setting that is broader than the network configuration setting.

User preferences include filtering criteria selected by the user and are applied to the programmed entries in the service table. The user may be allowed to individually enable/disable each programmed entry in the service table. The user may also specify the priority level for each programmed entry. In this case, only incoming broadcast messages for the selected/enabled programmed entry having priority equal to or greater than the specified priority in the service table are processed by the wireless device.

Filtering configurations may be defined for broadcast services for multiple networks. Broadcast messages for these networks are then filtered based on the filtering configurations applicable for these networks.

Table 4 shows the filtering configurations supported by GSM, UMTS and CDMA. For the network configuration, filtering with the service table is supported by CDMA but not by GSM and UMTS. For the user configuration, the broadcast messages can be filtered with the service table for CDMA and with language preferences for GSM and UMTS. Filtering with the service table may also be implemented for GSM and UMTS, although this is not described in the GSM and 3GPP standards. For the user preferences, broadcast messages may be filtered based on various fields such as (1) Service ID, Selected, Priority, Label, Alert, and Max Messages for CDMA and (2) Service ID, Selected, and Label for GSM and UMTS. Each of the three filtering configurations (network configuration, user configuration, and user preferences) can be defined to cover a superset of all possible values for this configuration. For example, the user configuration may take on values of 'Activate All', 'Activate Table Only', 'Activate without language preferences', and 'Deactivate'.

TABLE 4

Filtering Configuration Parameters

| Configuration | CBS (GSM & UMTS) | Broadcast SMS (CDMA) |
| --- | --- | --- |
| Network Configuration | Allow, Disallow | Allow All, Allow Table Only, Disallow |
| User Configuration | Activate, Deactivate, Activate without language preferences | Activate All, Activate Table Only, Deactivate |
| User Preferences | Service ID (Message Identifier), Selected, Label | Service ID (Service Category, Language), Selected, Label, Priority, Alert Option, Max Messages |

The filtering configurations may be stored in a non-volatile memory that is within the wireless device or accessible to the wireless device. The non-volatile memory may be a Flash, an electrically erasable programmable read only memory (EEPROM), a multimedia card (MMC), or some other non-volatile memory type. The filtering configurations may also be stored as elementary files (EFs) in a removable module, which is referred to as SIM/USIM for GSM and UMTS and Removable User Identity Module (R-UIM) for CDMA. For GSM and UMTS, an $EF_{CBMI}$ file stores a list of broadcast services that the user selects to receive, and an $EF_{CBMIR}$ file stores a list of broadcast services that the user must receive. For CDMA, an $EF_{BCsMspref}$ file stores the user configuration setting and an $EF_{BCsMStable}$ file stores the information for the service table and the filtering criteria related to user preferences.

The filtering of broadcast messages with the filtering configurations is described below.

3. System

Figure 5:
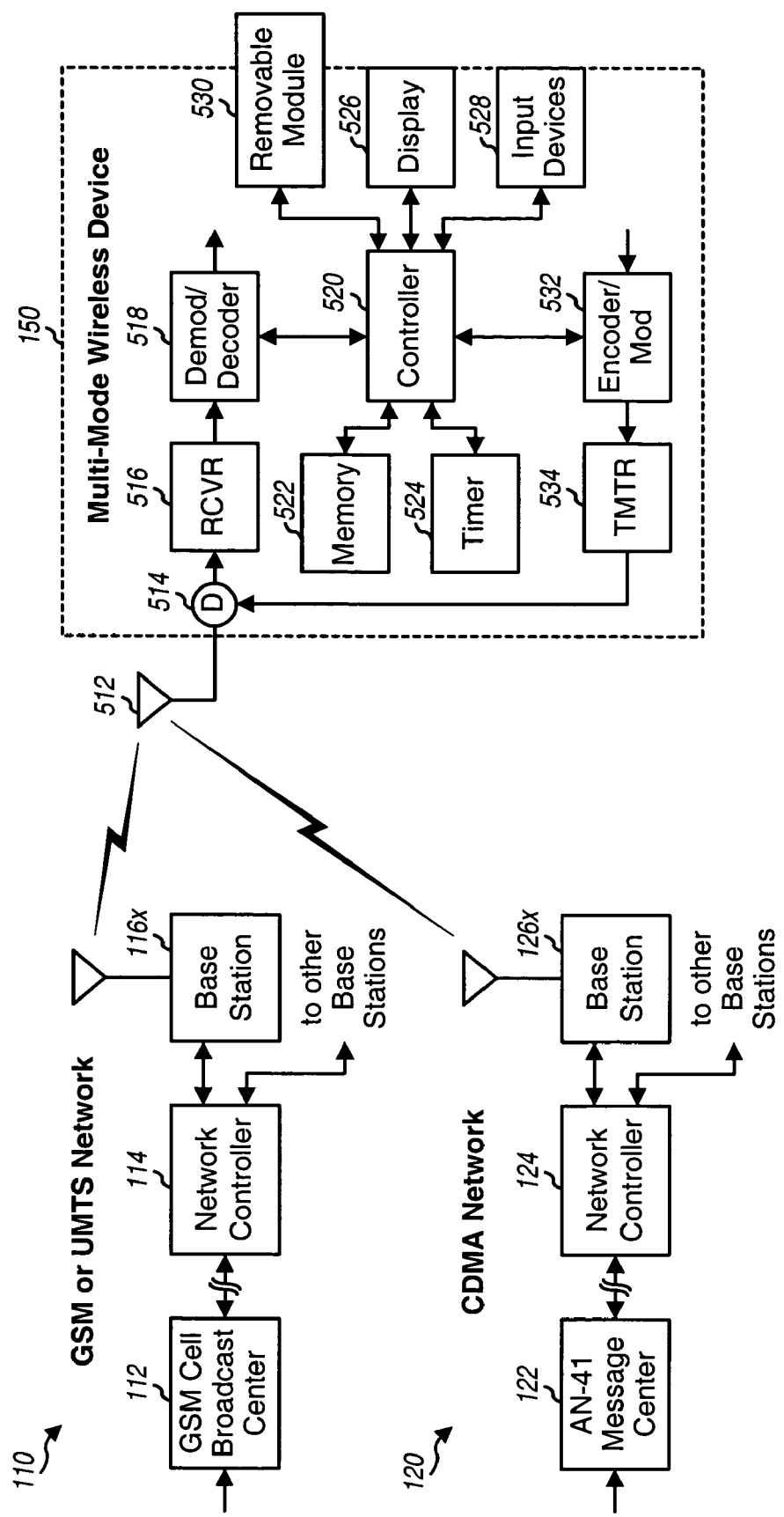
FIG. 5 shows a block diagram of a multi-mode wireless device.

FIG. 5 shows a block diagram of wireless device 150. For GSM or UMTS network 110, cell broadcast center 112 processes broadcast data and provides CBS messages to network controller 114, which further forwards these messages to the proper base stations 116. Each base station 116 processes and transmits the CBS messages to wireless devices within its coverage area. The network entities within CDMA network 120 similarly process and transmit broadcast SMS messages to wireless devices within the coverage area of network 120.

At wireless device 150, on the receive path, the signals transmitted by the base stations in network 110 and 120 are received by an antenna 512, routed through a duplexer (D) 514, and provided to a receiver unit (RCVR) 516. Receiver unit 516 conditions (e.g., filters, amplifies, and frequency downconverts) the received signal and further digitizes the conditioned signal to obtain samples. A demodulator (Demod)/decoder 518 then demodulates and decodes the samples (e.g., based on the physical layer processing defined by the network being received) and provides decoded data for broadcast messages and other messages sent by the base stations. The received broadcast messages are provided to a controller 520 for further processing. Controller 520 may store the broadcast messages in a memory unit 522 and/or provide the broadcast messages to a display unit 526 for presentation to the user. On the transmit path, data and messages to be sent by wireless device 150 are encoded and modulated by an encoder/modulator (Mod) 532, conditioned by a transmitter unit (TMTR) 534, routed through duplexer 514, and transmitted via antenna 512 to the base station(s).

Controller 520 directs the operation of the processing units within wireless device 150. For example, controller 520 may control the reception of broadcast services for multiple networks, the filtering of broadcast messages, and so on. Memory unit 522 stores program codes and data used by controller 520 and other units. A timer 524 provides timing information that may be used to implement time-based broadcast reception, which is described below. Input devices 528 receive inputs from the user and provide the user inputs to controller 520. A removable module 530 (e.g., a SIM/USIM or R-UIM) may be used to store pertinent information such as the composite set of parameters, the filtering configurations, time-based broadcast reception information, and so on.

Figure 6:
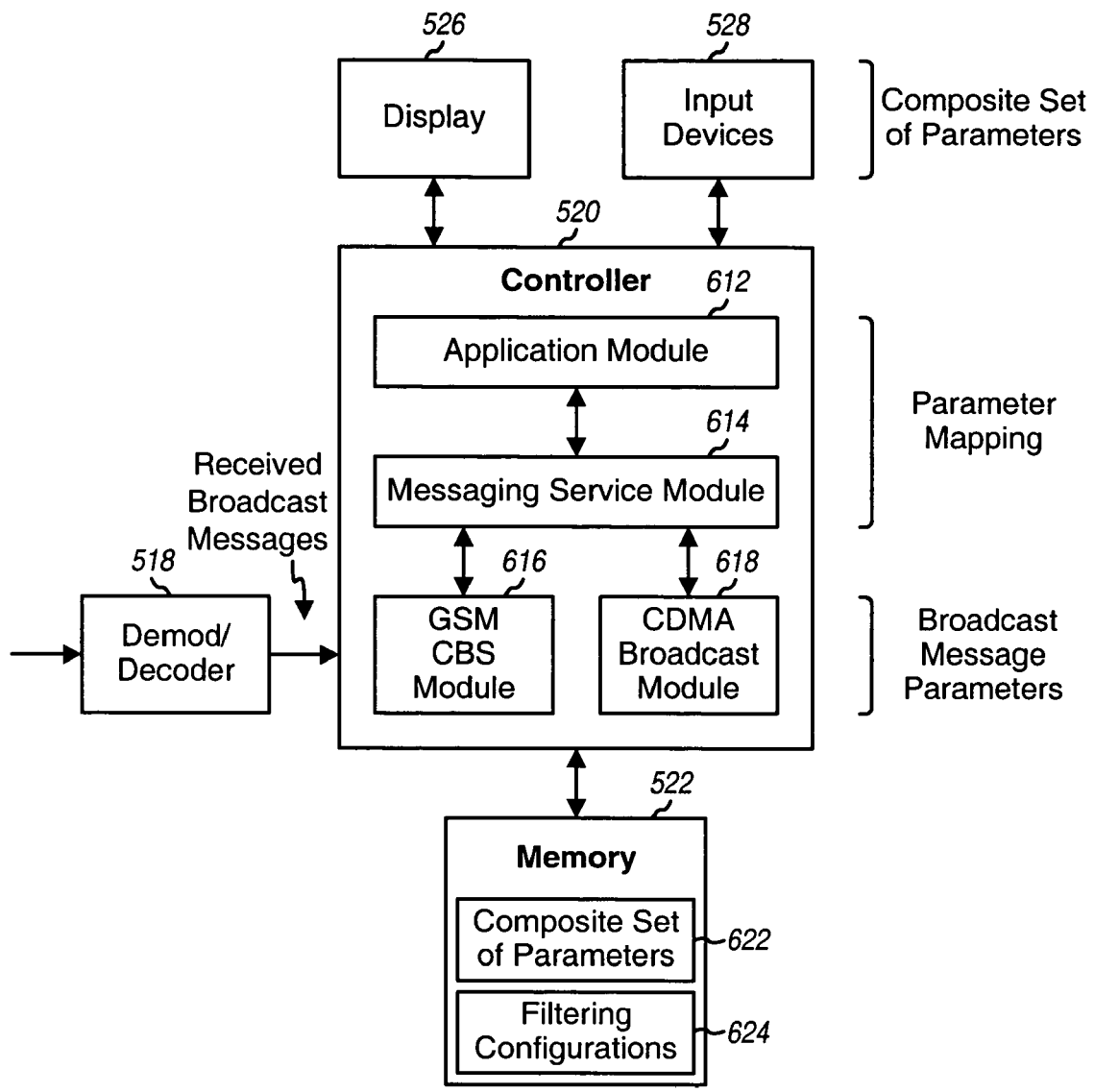
FIG. 6 shows a controller capable of receiving broadcast services from multiple wireless networks.

FIG. 6 shows a design of controller 520 capable of providing transparent broadcast services for wireless device 150. Memory unit 522 stores the composite set of parameters 622 for broadcast services and filtering configurations 624 for all supported networks. Demodulator/decoder 518 provides broadcast messages received from networks 110 and 120 to controller 520.

Within controller 520, a GSM CBS module 616 performs processing for CBS messages received from GSM or UMTS network 110. A CDMA broadcast module 618 performs processing for broadcast SMS messages received from CDMA network 120. Modules 616 and 618 process their broadcast messages in conventional manner based on the parameters of the broadcast messages. Modules 616 and 618 typically detect for duplicate broadcast messages and discard duplicate messages. Modules 616 and 618 also filter broadcast messages based on the filtering configurations for networks 110 and 120, respectively.

A messaging service module 614 maintains the composite set of parameters for broadcast services and the filtering configurations for networks 110 and 120. Module 614 provides the filtering configurations to modules 616 and 618 for filtering broadcast messages from networks 110 and 120, respectively.

Messaging service module 614 also receives CBS messages processed by module 616 and broadcast SMS messages processed by module 618. Module 614 maps the contents of the parameters in the CBS messages and broadcast SMS messages to the corresponding parameters in the composite set. Module 614 provides the contents of the parameters in the composite set to an application module 612. Module 614 also provides an application programming interface (API) that is used by application module 612 to access services provided by GSM CBS module 616 and CDMA broadcast module 618. Application module 612 provides an interface for the user and communicates with messaging service module 614 to provide broadcast services for networks 110 and 120.

Application module 612 and messaging service module 614 collectively provide transparent broadcast services. Messaging service module 614 attempts to hide, as much as possible, the implementation details for the underlying networks from application module 612. Application module 612 attempts to hide, as much as possible, the remaining implementation details from the user.

Application module 612 presents applicable parameters in the composite set to the user for review, selection, and/or other purposes. For each parameter that is user selectable or configurable, the user may be presented with a comprehensive list of the available options/values for the parameter for all supported networks. For example, a superset of types/service categories for all supported networks may be displayed for selection by the user. The user need not be made aware of which specific types/service categories are supported by which network. As another example, a superset of all languages may be presented to the user. Depending on the desired implementation, the service categories and languages may be presented separately for independent selection by the user or presented together for selection in combination. The channel guide may be displayed (e.g., when requested) so that the user can browse through and select the desired services. The network related information may be hidden from the user and presented if requested by the user.

Application module 612 can also hide the differences when (1) a CDMA network sends a CDMA Point-to-Point SMS Message with Service Category Programming Teleservice (SCPT) information to add or delete service table entries in the wireless device's memory or RUIM or (2) a GSM/UMTS network sends a Point-to-Point or CB Download message to the wireless device's SIM/USIM for updating the service table stored on the SIM/USIM's $EF_{CBMI}$, $EF_{CBMIR}$, $EF_{CBMID}$ and other elementary files that affect CB filtering.

Some of the parameters in the composite set are used for processing broadcast messages received from the networks and are transparent to the user. GSM CBS module 616 can process CBS messages in the conventional manner and need not be aware of CDMA broadcast module 618, and vice versa. Messaging service module 614 maps the parameters of the received broadcast message to the corresponding parameters in the composite set. For example, module 614 may set the Message Class parameter to the message class obtained from a received broadcast message, if it is a CBS message, or a default value, if it is a broadcast SMS message. Application module 612 can then route and store the broadcast message in the proper manner based on the Message Class parameter. As another example, messaging service module 614 may set the Message Concatenation parameter to the values from the Page Parameter of a received CBS message or the Header_Ind and User Data Header parameters of a received broadcast SMS message. Application module 612 can then perform concatenation based on the Message Concatenation parameter. As yet another example, messaging service module 614 may set the Encoding parameter to the values from the Data Coding Scheme parameter of a received CBS message or the Msg_Encoding and Message_Type fields of a received broadcast SMS message. Application module 612 can then use the proper bit map for the encoding scheme used for the broadcast message, as indicated by the Encoding parameter, to display the broadcast message. In general, if a given parameter in the composite set is applicable to a particular network, then that parameter is populated with the contents of the associated/mapped parameter of the broadcast message for that network. If the parameter in the composite set is not applicable to the network, then the parameter may be populated with a default value.

FIG. 6 shows a specific design for supporting transparent broadcast services. Various other designs are also possible, and this is within the scope of the invention. As examples, one module can perform the functions of both modules 616 and 618, one module can perform the functions of both modules 612 and 614, and so on. Modules 612 through 618 may be implemented in hardware or software.

Figure 7:
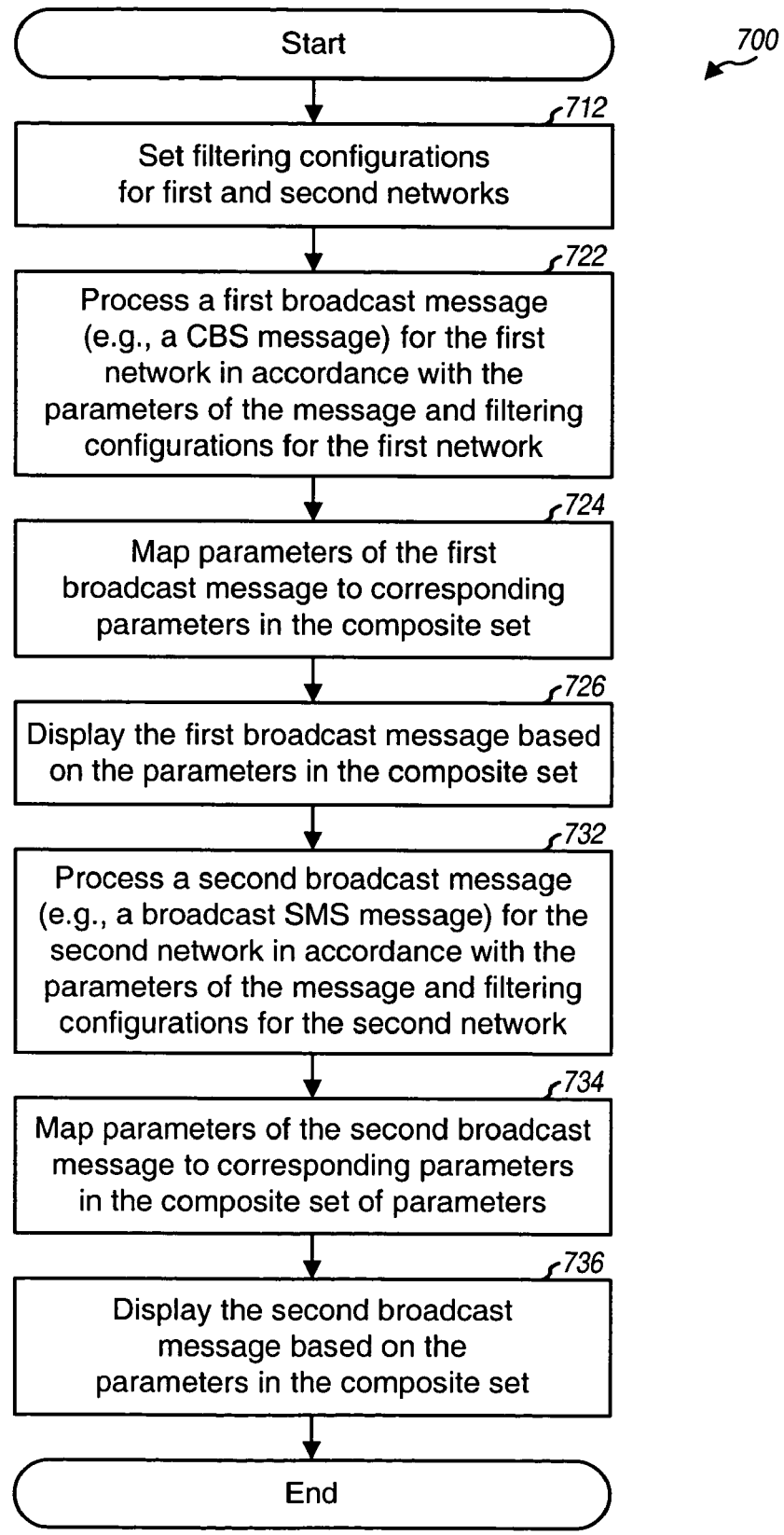
FIG. 7 shows a process for transparent broadcast service reception.

FIG. 7 shows a process 700 for providing transparent broadcast services for wireless device 150. Initially, the filtering configurations for all of the supported networks are set by the network operator and/or the user (block 712). For broadcast reception for a first network (e.g., a GSM or UMTS network), a first broadcast message (e.g., a CBS message) for the first network is received and processed (e.g., by GSM CBS module 616) in accordance with the parameters of this message and the filtering configurations for the first network (block 722). The parameters of the first broadcast message are mapped (e.g., by messaging service module 614) to corresponding parameters in the composite set (block 724). The first broadcast message is further processed and displayed (e.g., by application module 612) based on the parameters in the composite set (block 726).

For broadcast reception for a second network (e.g., a CDMA network), a second broadcast message (e.g., a broadcast SMS message) for the second network is received and processed (e.g., by CDMA broadcast module 618) in accordance with the parameters of this message and the filtering configurations for the second network (block 732). The parameters of the second broadcast message are mapped to corresponding parameters in the composite set (block 734). The second broadcast message is further processed and displayed based on the parameters in the composite set (block 736).

In general, the wireless device may be able to receive and process broadcast messages for only one network at a time or for both networks concurrently. The broadcast reception capability may be dependent on various factors such as the design and/or configuration of the wireless device, the coverage received by the wireless device, and so on.

4. Time-Based Broadcast Reception

Broadcast services may also be received by the wireless device based on time. One or more sets of broadcast services may be defined, where each set can include any number and combination of broadcast services. Each service set is also associated with times during which the set is activated and/or times during which the set is deactivated. For a given service set, when the time for activation commences, the broadcast services in the set are activated and the wireless device receives and processes broadcast messages for these services. When the time for activation concludes, the broadcast services in the set are deactivated and the wireless device does not process broadcast messages for these services. A timer or alarm clock (e.g., timer 524 in FIG. 5) can provide timing information used to automatically activate or deactivate each service set.

The user can define the service sets such that the pertinent broadcast information is obtained. For example, the user may define a first service set with traffic report, stock quotes and local/national news to be activated during morning commuting hours from 7 AM to 10 AM, a second set with traffic report and local news to be activated during evening commuting hours from 4 PM to 7 PM, a third set with weather and news to be activated on weekends, and so on.

The time-based broadcast reception function may be viewed as an additional filtering criterion on top of the network configuration, user configuration, and user preferences described above. The wireless device would receive and process broadcast messages that meet the configuration settings as well as the time constraints defined for the service sets.

The time-based broadcast reception function may also be used to change the user preference settings (e.g., such as those listed in FIG. 4) based on time. This function may be used to change the priority of broadcast services in CDMA. For example, the user may want to receive all weather forecast messages during the day and only emergency weather forecast messages during the evening. This function may also be used to change the language preferences of broadcast services in GSM and CDMA. For example, the user may want to receive news in English during the day and news in Spanish during the evening. This function may also be used to change the broadcast alert setting automatically depending on time. For example, the user may want to be alerted of received broadcast messages with vibration during the day and with audible beeps during the evening.

Figure 8:
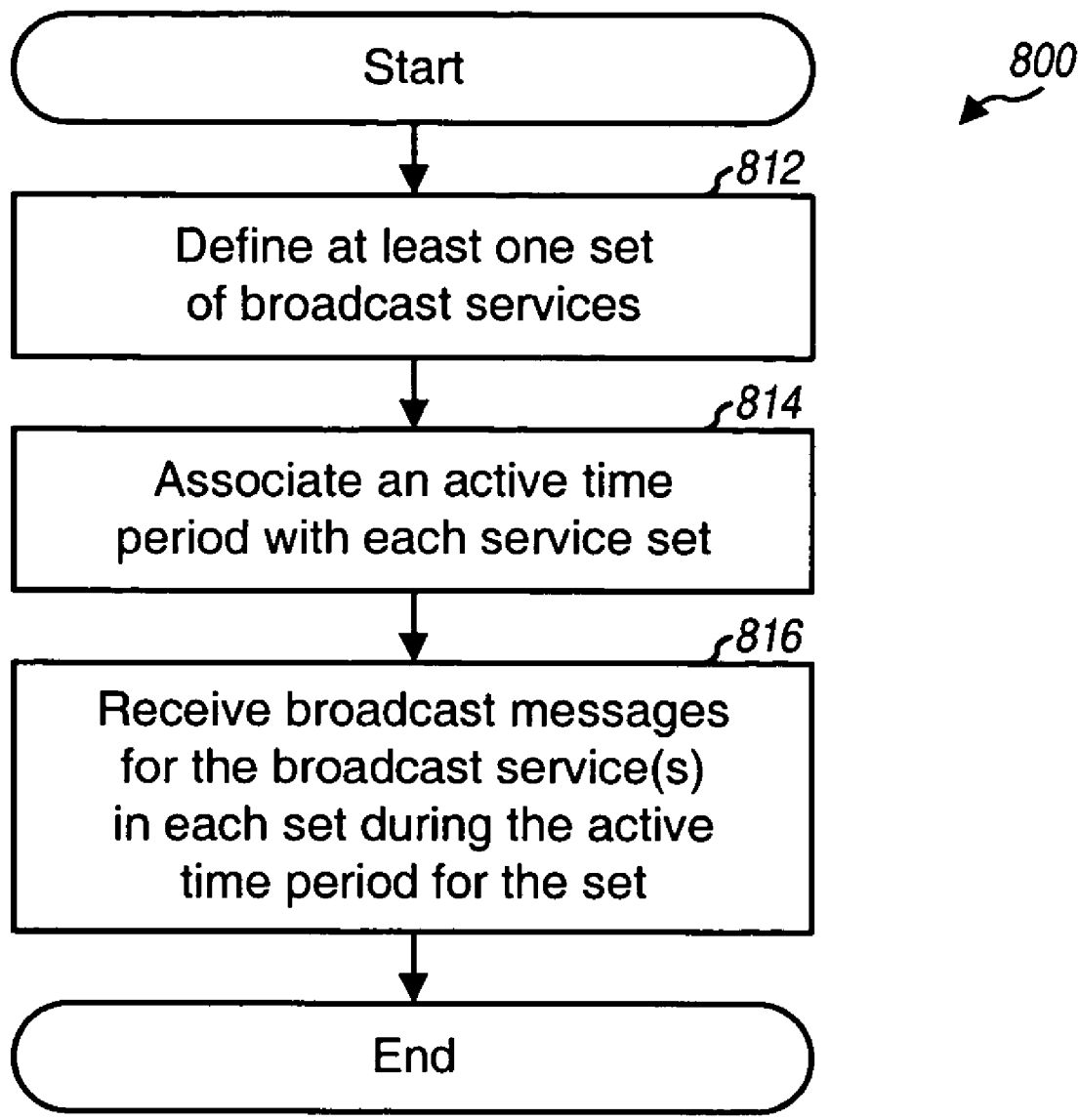
FIG. 8 shows a process for time-based broadcast reception.

FIG. 8 shows a process 800 for performing time-based broadcast reception. Process 800 may be used for receiving broadcast services from one or multiple wireless networks. Initially, at least one set of broadcast services is defined (block 812). Each service set includes at least one broadcast service provided by a wireless network. An active time period is associated with each service set (block 814). The active time period for each service set indicates the time period during which broadcast messages for the broadcast service(s) in the set are to be received by the wireless device. Thereafter, broadcast messages for the broadcast service(s) in each set are received during the active time period for that set (block 816).

For clarity, the transparent and time-based broadcast reception techniques have been described specifically for a GSM or UMTS network and a CDMA network. In general, these techniques may be used for any number of networks which may be of any wireless technology. For example, these techniques may be used to receive broadcast services from three or more wireless networks. A different broadcast message processing module (akin to modules 616 and 618) may be used for each different wireless network. The various broadcast message processing modules may communicate with messaging service module 614 to provide transparent broadcast reception.

The transparent and time-based broadcast reception techniques described herein may provide various benefits. These techniques can provide a technology independent user interface for broadcast services and improve user experience for broadcast services. As a result, the user may use broadcast services more due to improved ease of use, subscribe to more broadcast services, make more voice and/or data calls in response to received broadcast messages, and so on. This then increases system utilization and benefits the network operator as well as the user.

The transparent and time-based broadcast reception techniques described herein may be implemented by various means. For example, these techniques may be implemented in hardware, software, or a combination thereof. For a hardware implementation, the processing units used to facilitate and/or perform broadcast reception (e.g., modules 612, 614, 616 and 618 in FIG. 6) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the broadcast reception techniques described herein may be implemented with modules (e.g., procedures, functions, and so on), such as 612, 614, 616 and 618 in FIG. 6, that perform the functions described herein. The software codes may be stored in a memory unit (e.g., memory unit 522 in FIG. 5) and executed by a processor (e.g., controller 520). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
   a first module operable to process a first broadcast message for a first wireless communication system in accordance with parameters of the first broadcast message;
   a second module operable to process a second broadcast message for a second wireless communication system in accordance with parameters of the second broadcast message, the first and second broadcast messages having different formats; and
   a third module operable to receive and map the parameters of the first and second broadcast messages to corresponding parameters in a set of parameters defined for broadcast services, wherein the set of parameters is a composite set of parameters of the first and second broadcast messages.

2. The wireless device of claim 1, wherein the first broadcast message is a Cell Broadcast Service (CBS) message for Global System for Mobile Communications (GSM) and Universal Mobile Telecommunications System (UMTS) systems, and wherein the second broadcast message is a broadcast Short Message Service (SMS) message used for a Code Division Multiple Access (CDMA) system.

3. The wireless device of claim 1, further comprising:
a fourth module operable to process a third broadcast message for a third wireless communication system in accordance with parameters of the third broadcast message, and wherein the third module is further operable to map the parameters of the third broadcast message to corresponding parameters in the set of parameters defined for broadcast services.

4. The wireless device of claim 1, further comprising:
a fourth module operable to display the first and second broadcast messages based on the parameters in the set.

5. A wireless device comprising:
a first module operable to process a first broadcast message for a first wireless communication system in accordance with parameters of the first broadcast message;
a second module operable to process a second broadcast message for a second wireless communication system in accordance with parameters of the second broadcast message;
a third module operable to map the parameters of the first and second broadcast messages to corresponding parameters in a set of parameters defined for broadcast services; and
a fourth module operable to display the first and second broadcast messages based on the parameters in the set, wherein the fourth module is further operative to provide the parameters in the set for user review and selection instead of the parameters of the first and second broadcast messages.

6. A wireless device comprising:
a first module operable to process a first broadcast message for a first wireless communication system in accordance with parameters of the first broadcast message;
a second module operable to process a second broadcast message for a second wireless communication system in accordance with parameters of the second broadcast message; and
a third module operable to map the parameters of the first and second broadcast messages to corresponding parameters in a set of parameters defined for broadcast services, wherein each of the parameters in the set is associated with a mapped parameter for the first broadcast message, a mapped parameter for the second broadcast message, or a mapped parameter for both the first and second broadcast messages.

7. The wireless device of claim 6, wherein each parameter in the set associated with a mapped parameter for both the first and second broadcast messages can take on all values possible for the mapped parameter for the first and second broadcast messages.

8. The wireless device of claim 6, wherein each parameter in the set associated with a mapped parameter for the first broadcast message can take on all values possible for the mapped parameter of the first broadcast message and a default value for the second broadcast message.

9. The wireless device of claim 1, wherein the set includes a service identifier parameter indicative of broadcast services provided by the first and second systems.

10. A wireless device comprising:
a first module operable to process a first broadcast message for a first wireless communication system in accordance with parameters of the first broadcast message;
a second module operable to process a second broadcast message for a second wireless communication system in accordance with parameters of the second broadcast message; and
a third module operable to map the parameters of the first and second broadcast messages to corresponding parameters in a set of parameters defined for broadcast services, wherein the set includes an encoding parameter indicative of character sets used for broadcast messages received from the first and second networks and a language parameter indicative of languages used for the broadcast messages.

11. A wireless device comprising:
a first module operable to process a first broadcast message for a first wireless communication system in accordance with parameters of the first broadcast message;
a second module operable to process a second broadcast message for a second wireless communication system in accordance with parameters of the second broadcast message; and
a third module operable to map the parameters of the first and second broadcast messages to corresponding parameters in a set of parameters defined for broadcast services, wherein the set includes a display mode parameter indicative of display options for broadcast messages received from the first and second networks and a message replacement parameter used to replace old broadcast messages with new broadcast messages.

12. The wireless device of claim 1, wherein the first module is further operable to filter broadcast messages for the first system based on first filtering configurations, and wherein the second module is further operable to filter broadcast messages for the second system based on second filtering configurations.

13. The wireless device of claim 12, wherein the third module is operable to maintain the first and second filtering configurations for the first and second systems and to provide the first filtering configurations to the first module and the second filtering configurations to the second module.

14. A method of receiving broadcast services from a plurality of wireless communication systems, comprising:
processing a first broadcast message for a first wireless communication system in accordance with parameters of the first broadcast message;
processing a second broadcast message for a second wireless communication system in accordance with parameters of the second broadcast message, the first and second broadcast messages having different formats; and
receiving and mapping the parameters of the first and second broadcast messages to corresponding parameters in a set of parameters defined for broadcast services, wherein the set of parameters is a composite set of parameters of the first and second broadcast messages.

15. The method of claim 14, wherein the first broadcast message is a Cell Broadcast Service (CBS) message for Global System for Mobile Communications (GSM) and Universal Mobile Telecommunications System (UMTS) systems, and wherein the second broadcast message is a broadcast Short Message Service (SMS) message for a Code Division Multiple Access (CDMA) system.

16. The method of claim 14, further comprising:
displaying the first and second broadcast messages based on the parameters in the set.

17. The method of claim 14, further comprising:
filtering broadcast messages for the first system based on first filtering configurations; and filtering broadcast messages for the second system based on second filtering configurations.

18. A method of receiving broadcast services from a plurality of wireless communication systems, comprising:
processing a first broadcast message for a first wireless communication system in accordance with parameters of the first broadcast message;
processing a second broadcast message for a second wireless communication system in accordance with parameters of the second broadcast message;
receiving and mapping the parameters of the first and second broadcast messages to corresponding parameters in a set of parameters defined for broadcast services; and
providing parameters in the set for user review and selection instead of the parameters of the first and second broadcast messages.

19. An apparatus comprising:
means for processing a first broadcast message for a first wireless communication system in accordance with parameters of the first broadcast message;
means for processing a second broadcast message for a second wireless communication system in accordance with parameters of the second broadcast message, the first and second broadcast messages having different formats; and
means for receiving and mapping the parameters of the first and second broadcast messages to corresponding parameters in a set of parameters defined for broadcast services, wherein the set of parameters is a composite set of parameters of the first and second broadcast messages.

20. The apparatus of claim 19, further comprising:
means for displaying the first and second broadcast messages based on the parameters in the set.

21. The apparatus of claim 19, further comprising:
means for filtering broadcast messages for the first system based on first filtering configurations; and
means for filtering broadcast messages for the second system based on second filtering configurations.

22. A processor readable media for storing instructions in a wireless device, comprising:
a module to process a first broadcast message for a first wireless communication system in accordance with parameters of the first broadcast message;
a module to process a second broadcast message for a second wireless communication system in accordance with parameters of the second broadcast message, the first and second broadcast messages having different formats; and
a module to receive and map the parameters of the first and second broadcast messages to corresponding parameters in a set of parameters defined for broadcast services, wherein the set of parameters is a composite set of parameters of the first and second broadcast messages.

23. A method of receiving broadcast services in a wireless communication system, comprising:
defining a composite set of broadcast message parameters including at least a first set and a second set of parameters corresponding to first and second broadcast services;
respectively associating the first set and the second set with first and second active time periods indicative of when broadcast messages for the first and second broadcast services are to be received; and
receiving broadcast messages from at least one of the first and second broadcast services in the respective active time period.

24. The method of claim 23, wherein each of the at least one broadcast service in the first set corresponds to a different service category for broadcast messages in the system.

25. A method of receiving broadcast services in a wireless communication system, comprising:
defining a first set of at least one broadcast service supported by the system;
associating the first set with a first active time period indicative of when broadcast messages for the at least one broadcast service in the first set are to be received; and
receiving broadcast messages for the at least one broadcast service in the first set during the first active time period, wherein each of the at least one broadcast service in the first set corresponds to a different combination of service category and language for broadcast messages in the system.

26. The method of claim 23, further comprising:
receiving broadcast messages for both the first and second broadcast services in the respective active time period.

27. A wireless device in a wireless communication system, comprising:
a controller operative to store a composite set of broadcast service parameters including at least a first set and a second set of parameters corresponding to first and second broadcast services and to respectively associate the first set and the second set with first and second active time periods indicative of when broadcast messages for the first and second broadcast services are to be received; and
a processing unit operative to process received broadcast messages from at least one of the first and second broadcast services in the respective active time period.

28. The wireless device of claim 27, further comprising:
a timer operative to provide indications of start and end of the respective active time period.

* * * * *

UNITED STATES PATENT AND TRADEMARK OFFICE
CERTIFICATE OF CORRECTION

PATENT NO.       : 7,657,234 B2                                        Page 1 of 1
APPLICATION NO. : 10/773783
DATED            : February 2, 2010
INVENTOR(S)      : Qu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-eighth Day of December, 2010

David J. Kappos
*Director of the United States Patent and Trademark Office*